Oct. 23, 1934.   S. J. WEITZER   1,977,707
METHOD OF AND APPARATUS FOR TESTING
Filed Dec. 29, 1932
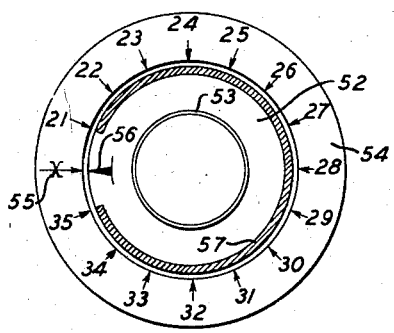
FIG. 1.
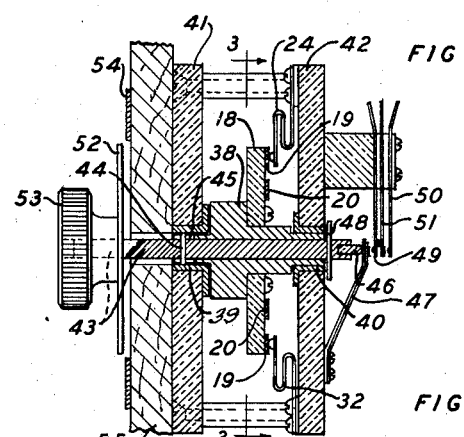
FIG. 2.
FIG. 3.
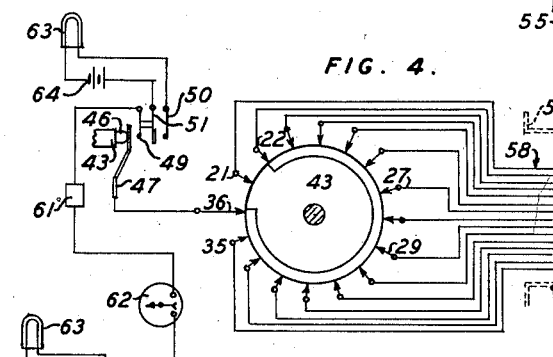
FIG. 4.
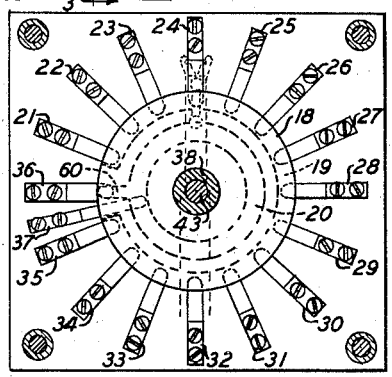
FIG. 5.
FIG. 7.
FIG. 8.
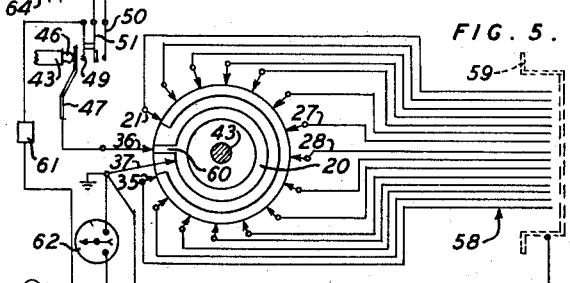
FIG. 6.
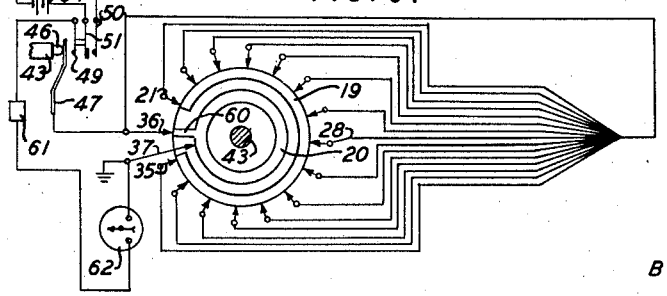
INVENTOR
S. J. WEITZER
BY
E. R. Nowlan
ATTORNEY Patented Oct. 23, 1934

1,977,707

UNITED STATES PATENT OFFICE 1,977,707

METHOD OF AND APPARATUS FOR TESTING

Solle J. Weitzer, New York, N. Y., assignor to Western Electric Company, Incorporated, New York, N. Y., a corporation of New York Application December 29, 1932, Serial No. 649,337

5 Claims. (Cl. 200—7)

This invention relates to methods of and apparatus for testing and more particularly the testing of multiple wiring or multiple conducting circuits.

An object of the invention is to provide an improved method of and apparatus for testing, in succession, a plurality of electrical circuits for predetermined characteristics.

In a preferred embodiment of the invention there is employed a rotary switch having an outer segmental portion of a flat annular shaped contact strip, and an inner flat contact strip in the form of a complete annulus with a flat contact strip integral therewith and extending radially outward therefrom midway between the ends of the outer segmental portion. The relative positions or spacing of the three contact strips does not change but their mutual position possesses a definite geometric relation to a group of stationary contacts to which the conductors, under test, are connected and which contacts are capable of making contact with the rotating contact strips. The three contact strips and the group of stationary contacts are arranged so that the device will rapidly and safely test a number of conductors and metallic parts for grounds, short circuits and continuity. Signal devices are preferably connected to the rotary switch to indicate the characteristics of the conductors under test.

Other objects and advantages of the invention will become apparent from the following detailed description and accompanying drawing showing one embodiment of the invention, wherein Fig. 1 is a front view of the rotary switch showing the face of the dial;

Fig. 2 is a side view, partially in section, of the rotary switch;

Fig. 3 is a sectional view taken on the line 3—3 of Fig. 2;

Fig. 4 is a circuit employing the rotary switch for testing a plurality of conductors for grounds or leakage;

Fig. 5 is a circuit arrangement employing the rotary switch for testing a plurality of conductors for grounds and shorted conductors;

Fig. 6 shows the same circuit arrangement as Fig. 5 with the conductors connected for making continuity tests, and Figs. 7 and 8 show relative positions of the stationary contacts with reference to the contact strips as the switch is rotated in a clockwise direction from the position shown in Fig. 5.

Referring to Figs. 1 to 3 inclusive, the rotary switch includes a rotatable insulating disc 18 having a segmental portion of a flat annular contact strip 19 secured to the surface of the insulating disc 18, a flat contact strip 20 in the form of a complete annulus and having a flat contact strip 60 integral therewith and extending radially outward therefrom secured to the surface of the insulating disc 18 with the contact strip 20 concentrically within the contact strip 19 and the outwardly extending contact strip 60 positioned substantially in the center of the segmental opening of the outer contact strip 19. Stationary contacts 21 to 35 are arranged to have the conductors to be tested connected thereto, and stationary contacts 36 and 37 are arranged to have the source of testing voltage and indicating instruments connected thereto. The contacts 21 to 36 inclusive are arranged to selectively contact with the outer annular contact strip 19 and the outwardly extending contact strip 60. The spacing between each of the contacts 21 to 36 inclusive and the contacts on either side thereof is the same and the segmental opening in the outer contact strip 19 is equal to twice the distance between any two adjoining contacts 21 to 36 inclusive. The stationary contact 37 is arranged to contact with the inner annular contact strip 20.

The rotatable insulating disc 18 is secured to a hub 38 and the hub 38 is arranged to rotate in bushings 39 and 40 which are secured to insulating end plates 41 and 42 respectively. A shaft 43, slidable with respect to the hub 38, extends through the center of the hub 38. A pin 44 secured to the shaft 43 extends into a slot 45 in hub 38 to permit the shaft 43 to slide back and forth with respect to the hub 38 and to prevent rotation of the shaft 43 without corresponding rotation of the hub 38. An insulating stud 46 is secured to the rear end of the shaft 43 and a contact spring 47 bears against the stud 46 pushing the shaft 43 toward the front of the switch. A stop pin 48 secured to the shaft 43 limits the forward movement of the shaft 43. The rearward movement of the shaft 43 is limited by the pin 44 and the end of the slot 45 in the hub 48. A contact spring 49 normally out of engagement with the spring 47 is arranged to make contact with the contact spring 47 when the shaft 43 is moved rearward against the tension of contact spring 47 and further rearward movement of the shaft 43 causes the normally open contact springs 50 and 51 to close.

A rotating dial 52 and a knob 53 are secured to the front end of the shaft 43. A stationary dial 54 is secured to a panel 55 upon which the rotary switch is mounted.

The stationary dial 54 has a series of numerals, 21 to 35, stamped thereon directly over the stationary contacts bearing the same numerals and at 55 a designation "X" directly over the stationary contact 36. The rotary dial 52 has a pointer or indicator 56 and a segmental annular strip 57 of a color different from that of the rest of the rotating dial 52. The segmental annular strip 57 extends clockwise from the position of the contact 21 to the position of the contact 35 and the pointer or indicator 56 is located midway between the ends of the segmental annular strip 57.

Fig. 4 shows a circuit arrangement employing the rotary switch described above for testing a plurality of conductors insulated from each other, and indicated generally by 58, for grounds or leakage to outer conducting elements such as a housing indicated generally at 59. In this arrangement the inner annular contact strip 20, contact segment 60 and the stationary contact 37 are not employed. The individual conductors 58 are connected to the contacts 21 to 35 inclusive. The contacts 36 and 47 are connected together. Between the housing 59 and contact 49, a source of testing voltage 61 and an indicating instrument 62 are connected in series. A lamp 63 or other suitable indicating instrument and a source of potential 64 are connected in series across the normally open contacts 50 and 51.

The operation of the circuit arrangement shown in Fig. 4 is as follows: With the dial 52 in the position shown in Fig. 1, pressure forcing the shaft 43 to the rear will cause the contacts 47 and 49 to close and also cause contacts 50 and 51 to close and light the lamp 63. However, with the dial in this position the contact spring 36 will not be in contact with the outer annular segment 19 and the testing circuit will not be completed. If the rotatable dial 52 is now turned clockwise until the pointer 56 is opposite the numeral 21 the contact spring 36 will make contact with the outer annular segment 19 as shown in Fig. 4. If, in this position, there is no contact between any of the conductors 58 and the housing 59 and insufficient leakage between all of the conductors 58 and the housing 59 the indicator 62 will remain inoperative, thereby indicating normal condition for all of the conductors 58, with respect to the housing 59. If one of the conductors 58 makes contact with the housing 59 the indicating instrument 62 will operate and show that an abnormal condition exists. To determine which one of the conductors 58 is grounded or has abnormal leakage with respect to the housing 59, it is only necessary to rotate the dial 52 through an angle less than 360° and at the same time to watch the indicating instrument 62. As the dial is rotated in a clockwise direction, each of the stationary contacts 21 to 35 inclusive, in turn, breaks contact with the outer annular contact segment 19. When the pointer 56 is opposite the numeral 21 on the dial, all the contact springs 22 to 36 inclusive, are in contact with the outer annular contact segment 19 and the contact spring 21 is not in contact therewith. If the conductor connected to contact spring 21 is the grounded conductor, and the other are ungrounded, the indicating instrument 62 will indicate normal condition for the conductors connected to contact springs 22 to 35 inclusive, showing that the conductor connected to contact spring 21 is at fault. Continued rotation of the dial 52 in a clockwise direction will, in a similar manner, disconnect each of the other conductors in turn from the testing circuit.

Fig. 5 shows a circuit arrangement similar to Fig. 4 except that the inner annular contact strip 20, the contact segment 60 and the stationary contact 37 are also employed. The contact 37 is connected to one side of the indicating instrument 62, to the housing 59, and to ground. The other side of the indicating instrument 62 is connected through the source of testing potential 61 to contact 49. Contact 47 is connected to contact 36. This circuit arrangement is employed to test for conductor grounds and for short circuits between the individual conductors comprising the group 58.

The operation of the circuit arrangement shown in Fig. 5 is as follows: When the rotating dial 52 is in the position shown in Fig. 1, the relative positions of the stationary contacts 21 to 37 inclusive and the contact strips 19 and 20 and contact segment 60 are as shown in Fig. 5. If the shaft 43 is now moved to the rear by exerting pressure on the knob 53 against the tension of spring 47 the indicating circuit is shorted through the contact segment 60 and the annular contact strip 20. This simulates a condition equivalent to a short circuit between any two conductors and furnishes a check to ascertain that the testing potential is connected and the indicating instrument properly functioning. If the dial 52 is now rotated clockwise until the indicator 56 is opposite the numeral 21, the relative positions of the contact strip 19 and contact segment 60 with respect to the stationary contacts 21 to 37 inclusive will be as shown in Fig. 7. In this position the contact springs 22 to 36 inclusive are in contact with the outer annular contact strip 19 and the contact spring 21 is in contact with the contact strip 60. This position tests the conductor which is connected to the contact spring 21 for short circuit or excessive leakage between the conductor connected to contact spring 21 and the other conductors which are connected to contact springs 22 to 35 inclusive and also for short circuits or excessive leakage between the conductor connected to contact spring 21 and the housing 59. If the conductor connected to the contact spring 21 is grounded on the housing 59, the indicating instrument 62 will function before the dial reaches this point and after it passes this point, but, will not function when the segment 60 is in contact with the contact spring 21. If the conductor 21 is shorted to another conductor, the indicator 62 will function when the contact segment 60 is in contact with the contact spring 21, but will not function just before or just after this point is reached. If the dial 52 is now rotated clockwise until the indicator 56 is opposite the numeral 22, the contact strip 19 and contact segment 60, and the stationary contacts 21 to 37 inclusive, will be as shown in Fig. 8. In this position the contact springs 21 and 23 to 36 inclusive are in contact with the outer annular contact strip 19 and the contact spring 22 is in contact with the contact strip 60. In this position the conductor connected to contact spring 22 is tested against all of the other conductors comprising the group 58 and the housing 59 in a manner similar to that described above for the conductor connected to contact spring 21. Continued rotation of the dial 52 in a clockwise direction will in a similar manner separately test each of the conductors 23 to 35 inclusive against all of the other conductors comprising the group 58 and against the housing 59.

The circuit arrangement shown in Fig. 6 is similar to that shown in Fig. 5 except that the far ends of each of the conductors to be tested are connected to the connection between the contacts 36 and 47 and the connection from the housing 59 is omitted. When the relative positions of the contact strip 19 and contact segment 60 and the stationary contacts 21 to 37 inclusive are as shown in Fig. 6, the indicating circuit is checked. Rotation of the dial 52 in a clockwise direction until the pointer 56 is opposite the numeral 21 will test the conductor connected to the contact spring 21 for continuity. The indicating instrument 62 will function if the conductor connected to the contact spring 21 is continuous, and will not function if the circuit through the conductor is open or incomplete. Continued rotation of the dial 56 will test the conductors connected to the contacts 22 to 35 inclusive, individually.

While a single embodiment of a rotary switch and several specific embodiments of circuits with which the switch may be employed have been disclosed, it is to be understood that the invention is not to be construed as limited to the specific disclosure but since it is also capable of other modifications and adaptations, it is to be limited only by the appended claims.

What is claimed is:

1. In a rotary switch, a rotatable flat segmental annular contact strip, a rotatable flat contact strip in the shape of a complete annulus having a radially projecting conducting portion extending therefrom, said rotatable contact strips being insulated from each other and having the first mentioned contact strip concentrically located with respect to the annular portion of the second mentioned contact strip and with the radially projecting conducting portion of the second mentioned contact strip located between the ends of the segmental portion of the first mentioned annular contact strip, and a plurality of stationary contact means cooperating with said contact strips.

2. In a rotary switch, a frame comprising an insulating support, an insulating member mounted in the frame for rotation therein, a flat segmental annular contact strip secured to the insulating member, a flat contact strip in the shape of a complete annulus having a radially projecting conducting portion extending therefrom secured to said insulating member, said first mentioned flat segmental strip and the annular portion of the second mentioned contact strip being concentrically located and the radially projecting conducting portion of the second mentioned contact strip extending therefrom between the ends of the segmental portion of the first mentioned annular contact strip, a plurality of stationary contacts mounted on the support for coaction with said contact strips, one of said contacts adapted to make contact with only the annular portion of the second mentioned contact strip, and another of said contacts adapted to make contact alternatively with said first mentioned contact strip and with the radially projecting portion of the second mentioned contact strip.

3. In a rotary switch, a frame comprising an insulating support and a hub mounted therein, an insulating member mounted on the hub for rotation therewith, a flat segmental annular contact strip secured to the insulating member, a flat contact strip in the shape of a complete annulus having a radially projecting conducting portion extending outwardly therefrom secured to said insulating member concentrically with the first mentioned contact strip and having the radially projecting conducting portion extending outwardly therefrom between the ends of the segmental contact strip, a plurality of stationary contacts mounted on the support for coaction with said contact strips, one of said contacts adapted to make contact with only the annular portion of the second mentioned contact strip, another of said contacts adapted to make contact alternatively with said first mentioned contact strip and with the radially projecting portion of the second mentioned contact strip, a shaft extending through said hub slidable with respect to the hub and rotatable with the hub, and a pair of contacts mounted on the frame and actuated by sliding the shaft.

4. In an electrical device, a panel, a frame comprising a pair of spaced insulating supports attached thereto, a hub rotatably mounted in the supports, a shaft mounted in the hub to rotate therewith and to slide therein, a pair of electrical contacts mounted on one of the supports to be actuated by sliding the shaft, an insulating member mounted on the hub for rotation therewith, a first segmental annular contact plate mounted on the insulating member, a second annular contact plate also mounted on the insulating member concentric with the first annular plate and having an integral extension located in the gap of the first plate, a plurality of stationary contacts mounted on the frame to coact alternatively with the segmental first plate and with the extension of the second plate, and a stationary contact also mounted on the frame for coaction with the second plate only.

5. In an electrical device, a panel, a frame comprising a pair of spaced insulating supports attached thereto, a hub rotatably mounted in the supports, a shaft mounted in the hub to rotate herewith and to slide therein, a pair of electrical contacts mounted on one of the supports to be actuated by sliding the shaft, an insulating member mounted on the hub for rotation therewith, a first segmental annular contact plate mounted on the insulating member, a second annular contact plate also mounted on the insulating member concentric with the first annular plate and having an integral extension located in the gap of the first plate, a plurality of stationary contacts mounted on the frame to coact alternatively with the segmental first plate and with the extension of the second plate, a stationary contact also mounted on the frame for coaction with the second plate only, an indicator mounted on the shaft, and a dial mounted on the panel and bearing marks corresponding respectively to the stationary contacts.

SOLLE J. WEITZER.